United States Patent [19]

Foxman

[11] Patent Number: 4,847,133
[45] Date of Patent: Jul. 11, 1989

[54] SYNTHETIC FIBER HEALTHCARE FABRIC
[75] Inventor: Charles Foxman, St. Louis, Mo.
[73] Assignee: Medtex Products, Inc., St. Louis, Mo.
[21] Appl. No.: 199,766
[22] Filed: May 27, 1988
[51] Int. Cl.$^4$ .............................................. B32B 33/00
[52] U.S. Cl. ......................................... 428/91; 5/495; 428/131; 428/221; 428/224; 428/253
[58] Field of Search ................. 428/91, 131, 221, 224, 428/253; 5/495

[56] References Cited
U.S. PATENT DOCUMENTS

| | | | |
|---|---|---|---|
| 3,257,259 | 6/1966 | Law | 428/91 |
| 4,145,467 | 3/1979 | Malik | 428/91 |
| 4,468,910 | 9/1984 | Morrison | 428/131 |
| 4,597,218 | 7/1986 | Friemel et al. | 428/290 |
| 4,758,453 | 7/1988 | Challet et al. | 428/131 |

Primary Examiner—James J. Bell
Attorney, Agent, or Firm—Polster, Polster and Lucchesi

[57] ABSTRACT

A synthetic fiber healthcare fabric for use in blankets and the like includes a repeating pattern of synthetic fiber filaments arranged in an open work construction. The fabric includes laterally spaced groups of closely positioned synthetic fiber filaments which are arranged in a plurality of adjacent rows. The laterally spaced groups of closely positioned synthetic fiber filaments are laterally offset from one another in adjacent rows, but are longitudinally aligned with one another in alternating rows. Generally elongated openings are formed between adjacent pairs of laterally spaced groups of closely positioned synthetic fiber filaments and adjacent pairs of longitudinally aligned groups of closely positioned synthetic fiber filaments, thereby providing a light-weight fabric with spaced air-flow channels or openings. The synthetic fiber filaments also have a napped or brushed finish throughout the fabric on at least one side thereof in order to provide a series of randomly extending short fiber filaments projecting outwardly from the synthetic fiber filaments to provide an effective thermal barrier construction which also has a soft fabric feel.

10 Claims, 1 Drawing Sheet

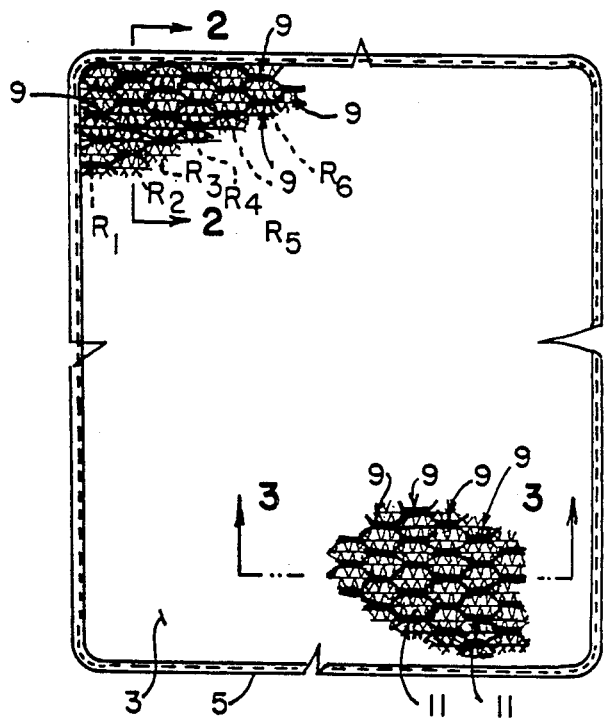
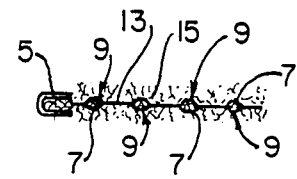
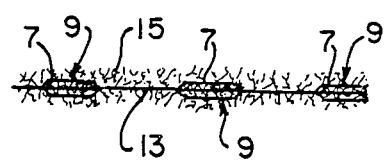
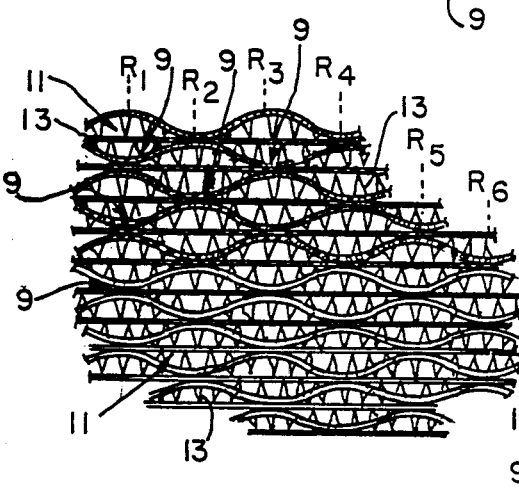
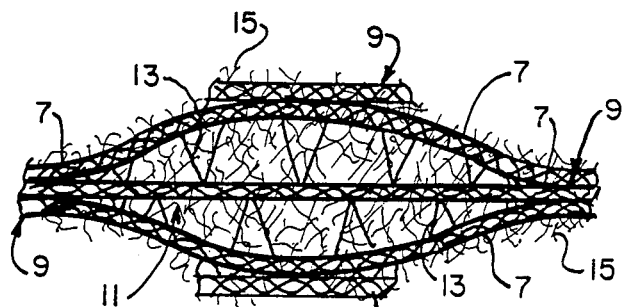
FIG. 1. FIG. 2. FIG. 3. FIG. 4. FIG. 5. FIG. 6.

SYNTHETIC FIBER HEALTHCARE FABRIC

BACKGROUND OF THE INVENTION

It will be appreciated that may hospitals, nursing homes and other institutions require continual washing and cleaning of textile products used by patients. That is why the healthcare industry, whenever possible, uses synthetic fiber materials. It is well known that synthetic fiber materials or fabrics are wrinkle resistant, require little or no ironing, last considerably longer than natural fabric products, are hypo-allergenic, are odor and mildew resistant, are bacterial and fungal resistant, have soil release characteristics and meet government specification for flame resistance.

One area of considerable interest in the healthcare industry involves bed covers and blankets for patients' beds. The use of a separate bed cover or spread and blanket for each patient bed not only is costly with respect to initial purchase, but requires separate handling and cleaning. Unlike hotels, motels and homes, a separate multi-colored bed cover or spread is not required in hospitals, nursing homes and other public institutions. At the same time, a blanket, which can also be used as a bed cover, should also be ornamental, and must meet all of the other needs required for textiles used in the healthcare industry. Where fabrics have multiple uses, such as a combined blanket and bed cover, there are other potential multiple uses of such fabrics for products such as a patient lap robe, for example, as disclosed in my copending patent application REVERSIBLE LAP ROBE Ser. No. 199,159 filed on May 26, 1984. Thus, there is considerable potential for a synthetic fiber healthcare fabric having multiple uses, as will be described herein.

SUMMARY OF THE INVENTION

Among the several objects and advantages of the present invention include:

The provision of a synthetic fiber healthcare fabric which has multiple uses, such as being both functional in use and ornamental in appearance;

The provision of such aforementioned synthetic fiber healthcare fabric which can be used as a blanket and bed cover or other patient product;

The provision of such aforementioned synthetic fiber healthcare fabric which provides an open-work light-weight construction that is also an effective thermal barrier;

The provision of such aforementioned synthetic fiber healthcare fabric which also provides air flow therethrough for patient comfort as well as sanitary and clean use; and The provision of such aforementioned synthetic fiber healthcare fabric which also minimizes washing or cleaning processing time, has all of the advantages and characteristics of synthetic fiber materials as described above, and is easy to manufacture and use.

Briefly stated, the synthetic fiber healthcare fabric of the present invention includes a repeating pattern of synthetic fiber filaments arranged in an open work construction throughout the fabric. A plurality of laterally spaced groups of closely positioned synthetic fiber filaments are arranged in a plurality of adjacent rows. The laterally spaced groups of closely positioned synthetic fiber filaments in immediately adjacent rows being laterally offset from one another while being longitudinally aligned with laterally spaced groups of closely positioned synthetic fiber filaments in alternating rows. The area between adjacent pairs of laterally spaced groups of closely positioned synthetic fiber filaments and adjacent pairs of longitudinally aligned groups of closely positioned synthetic fiber filaments defining a generally elongated opening, thereby providing a plurality of generally elongated openings throughout the fabric in order to permit air flow therethrough while providing a light-weight construction. The synthetic fiber filaments are also provided with a napped finish throughout the fabric on at least one side thereof in order to provide a series of randomly extending short fiber filaments projecting from the synthetic fiber filaments in the aforementioned adjacent and alternating rows, thereby establishing an effective thermal barrier construction while also providing a soft fabric feel.

Other and further objects and advantages of the present invention will become apparent from the ensuing description.

BRIEF DESCRIPTION OF THE DRAWINGS

In the drawing,

FIG. 1 is a fragmentary top plan view of a synthetic fiber healthcare fabric constructed as a blanket and bed cover combination and illustrating the repeating pattern of synthetic fiber filaments arranged in an open-work construction throughout the fabric;

FIG. 2 is a fragmentary sectional view as viewed along lines 2—2 of FIG. 1;

FIG. 3 is a fragmentary sectional view as viewed along lines 3—3 of FIG. 1;

FIG. 4 is an enlarged fragmentary top plan view of the open work construction of the synthetic fiber healthcare fabric of the present invention prior to the application of a napped or brushed finish thereto;

FIG. 5 is a fragmentary top plan view similar to FIG. 4 and illustrating the synthetic fiber healthcare fabric of the present invention with the napped or brushed finish applied thereto; and FIG. 6 is an even further enlarged fragmentary section view illustrating the manner in which groups of synthetic fiber filaments are arranged to form the elongated openings of the synthetic fiber healthcare fabric of the present invention.

DESCRIPTION OF THE PREFERRED EMBODIMENT

In the discussion that is to follow, it is to be understood that the synthetic fiber healthcare fabric of the present invention is preferably formed as a monofilament from 100 percent polyester material and is warp knit in the repeating open work pattern shown in the drawing. As discussed above, synthetic materials offer numerous advantages for healthcare products. The use of polyester fibers in fabrics is well known in the textile industry, as is warp knitting which is the typical method of machine loom fabrication of textile products for large scale operations.

As shown in FIG. 1 of the drawings, the synthetic fiber healthcare fabric 1 of the present invention is formed as a combination blanket and bed cover/spread because of the unique functional and ornamental construction as will be disclosed herein. The synthetic fiber healthcare fabric 1 can also be used in other products such as the REVERSIBLE LAP ROBE disclosed in my copending patent application Ser. No. 199,159 filed on May 26, 1988.

The combination blanket and bed cover/spread 3 which utlizes the synthetic fiber healthcare fabric 1 of the present invention has a border 5 which is simply a turned under and sewn peripheral edge of the combination blanket and bed cover/spread, 3, as is well known. The outer shape and configuration of the combination blanket and bed cover/spread 3 may be varied to suit the particulars desired.

The synthetic fiber healthcare fabric 1 of the present invention is shown in the drawings as a repeating pattern of synthetic fiber filaments 7 arranged in an open-work construction throughout the fabric 1 as will now be described. Since the synthetic fiber filaments 7 are preferably formed from a monofilament, the synthetic fiber filaments 7 are an integral part of the same monofilament, as will be understood.

A plurality of laterally spaced groups 9 of closely positioned synthetic fiber filaments 7 are arranged in a plurality of adjacent wors R1, R2, R3, R4, R5, R6, etc. The laterally spaced groups 9 of closely positioned synthetic fiber filaments 7 in immediately adjacent rows R1, R2, R3, R4, etc. are laterally offset from one another while being longitudinally aligned with laterally spaced groups 9 of closely positioned synthetic fiber filaments 7 in alternating rows, i.e., rows R1, R3, R5, etc. or rows R2, R4, R6, etc.

The area between adjacent pairs of laterally spaced groups 9 of closely positioned synthetic fiber filaments in the same row, and adjacent pairs of longitudinally aligned groups 9 of closely positioned synthetic fiber filaments (i.e., those groups 9 in alternating rows R1, R3, R5, etc.) define a generally elongated opening 11 so as to provide a plurality of generally elongated openings 11 throughout the synthetic fiber healthcare fabric 1 to permit air flow therethrough while providing a light-weight synthetic fiber healthcare fabric construction. The openings 11 throughout the fabric 1 are both vertically and diagonally aligned, as will be apparent.

Specifically, each of the generally elongated openings 11 give the appearance of having a generally elongated polygonal configuration somewhat in the form of a generally elongated octagonal opening 11, so as to provide an ornamental and aesthetic appearance for the synthetic fiber healthcare fabric 1 as seen in FIG. 1, while at the same time providing all of the functional features as described herein. As can be seen in FIGS. 4-6, the actual shape of the elongated openings 11 have a rounded oblong appearance; however, in the pattern shown in FIG. 1 of the drawing which is representative of what is actually used, the visual appearance of the elongated openings 11 is in the form of a generally elongated polygonal shape.

Within each of the elongated openings 11, an interconnecting synthetic fiber filament 7 extends thereacross and includes series of spaced loop stitches 13, also formed as an interconnecting portion of the monofilament forming the synthetic fiber filaments 7.

Attention is invited to a comparison of the synthetic fiber healthcare fabric 1 shown in FIGS. 4 and 5 of the drawings. In FIG. 4, the synthetic fiber healthcare fabric 1 is shown prior to being napped or brushed, whereas in FIG. 5 of the drawings, the synthetic fiber healthcare fabric 1 is shown with a series of randomly extending short fiber filaments 15 projecting from the synthetic fiber filaments 7. The randomly extending short fiber filaments 15 are formed from the synthetic fiber filaments 7 by using revolving cylinders with metallic points or the like to raise the randomly extending fibers 15 of the synthetic fiber filaments 7. The napping or brushing of the synthetic fiber filaments 7 to produce the randomly extending short filaments 15 offers, together with the open-work construction of the synthetic fiber healthcare fabric 1 and the polyester material from which is made, an effective thermal barrier which also has a soft fabric feel.

Thus, it will be appreciated that the repeating pattern and geometrical construction (preferably generally elongated octagonal configuration) of the generally elongated openings 11, together with the arrangement of the groups 9 of the synthetic fiber filaments 7, and the napping or brushing of the synthetic fiber filaments 7, providing the series of randomly extending short fiber filaments 15, produces unique ornamental and functional features in the synthetic fiber healthcare fabric 1 of the present invention. The combined functional features not only include a light-weight fabric enabling air flow, but provides a thermal barrier with a soft fabric feel. Many other functional features and advantages as described above are also and together with the ornamental appearance created, a novel and unique functional/ornamental product has been developed.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. A synthetic fiber healthcare fabric for use in blankets and the like including a repeating pattern of synthetic fiber filaments arranged in an open work construction throughout the fabric and comprising:

a plurality of laterally spaced groups of closely positioned synthetic fiber filaments arranged in a plurality of adjacent rows and being interconnected by synthetic fiber filaments extending therebetween, all of said synthetic fiber filaments being formed from one monofilament element;

the laterally spaced groups of closely positioned synthetic fiber filaments in immediately adjacent rows being laterally offset from one another while being longitudinally aligned with laterally spaced groups of closely positioned synthetic fiber filaments in alternating rows;

the area between adjacent pairs of laterally spaced groups of closely positioned synthetic fiber filaments and adjacent pairs of longitudinally aligned groups of closely positioned synthetic fiber filaments defining a generally elongated opening, thereby providing a plurality of elongated openings throughout the fabric, in order to provide air flow therethrough while providing a light-weight construction;

said synthetic fiber filaments also having a napped finish throughout said fabric on at least on side thereof in order to provide a series of randomly extending short fiber filaments projecting from said synthetic fiber filaments to provide an effective thermal barrier construction while also having a soft fabric feel.

2. The synthetic fiber healthcare fabric as defined in claim 1 wherein each of said elongated openings are configured to give the appearance of an ornamental shape in order to allow said fabric to be used as a combined blanket and bed cover or other patient product.

3. The synthetic fiber healthcare fabric as defined in claim 2 wherein said elongated openings are arranged in a plurality of vertical and diagonally aligned rows throughout the fabric.

4. The synthetic fiber healthcare fabric as defined in claim 3 wherein said generally elongated openings give the appearance of generally elongated polygonal configurations.

5. The synthetic fiber healthcare fabric as defined in claim 4 wherein the visual appearance of said generally elongated polygonally-shaped openings appear as generally elongated octagonal configurations.

6. The synthetic fiber healthcare fabric as defined in claim 5 wherein there are an equal number of closely positioned synthetic fiber filaments in said groups of closely positioned synthetic fiber filaments in said rows.

7. The synthetic fiber healthcare fabric as defined in claim 1 wherein each of said elongated openings have at least one synthetic fiber filament extending thereacross.

8. The synthetic fiber healthcare fabric as defined in claim 7 wherein said synthetic fiber is a monofilament.

9. The synthetic fiber healthcare fabric as defined in claim 8 wherein said synthetic fiber is made from polyester material.

10. The synthetic fiber healthcare fabric as defined in claim 9 wherein said synthetic fiber filaments are constructed as a warp knitted fabric through a warp knitting process.

* * * * *

UNITED STATES PATENT AND TRADEMARK OFFICE
CERTIFICATE OF CORRECTION

PATENT NO. : 4,847,133
DATED : July 11, 1989
INVENTOR(S) : Charles Foxman

It is certified that error appears in the above-identified patent and that said Letters Patent is hereby corrected as shown below:

On the title page;

Assignee: Medtex Products, Inc. should be -- Medpat, Inc. --

Signed and Sealed this

Third Day of July, 1990

*Attest:*

HARRY F. MANBECK, JR.

*Attesting Officer*      *Commissioner of Patents and Trademarks*